(12) United States Patent
Hadley

(10) Patent No.: US 8,152,098 B2
(45) Date of Patent: Apr. 10, 2012

(54) TORQUE LIMITER WITH BRAKE

(75) Inventor: Kevin Richard Hadley, Much Wenlock (GB)

(73) Assignee: Goodrich Actuation Systems Limited, Solihull (GB)

( * ) Notice: Subject to any disclaimer, the term of this patent is extended or adjusted under 35 U.S.C. 154(b) by 486 days.

(21) Appl. No.: 12/414,866

(22) Filed: Mar. 31, 2009

(65) Prior Publication Data
US 2009/0250308 A1 Oct. 8, 2009

(30) Foreign Application Priority Data
Apr. 4, 2008 (GB) .................................. 0806104.6

(51) Int. Cl.
*B64C 13/00* (2006.01)
(52) U.S. Cl. ....... 244/99.2; 244/99.3; 188/134; 192/223
(58) Field of Classification Search .................. 244/99.2, 244/99.3, 231; 192/223, 223.2; 188/67, 188/134, 265
See application file for complete search history.

(56) References Cited

U.S. PATENT DOCUMENTS

| 4,625,843 | A | * | 12/1986 | Maltby et al. | 192/223.3 |
|---|---|---|---|---|---|
| 5,299,666 | A | * | 4/1994 | Lang et al. | 188/134 |
| 5,630,490 | A | * | 5/1997 | Hudson et al. | 192/223.3 |
| 2002/0030138 | A1 | * | 3/2002 | Serven | 244/75 R |
| 2006/0111192 | A1 | * | 5/2006 | Bae | 464/35 |
| 2006/0163026 | A1 | * | 7/2006 | Lang | 192/223 |

FOREIGN PATENT DOCUMENTS

| EP | 873937 A2 * | 10/1998 |
|---|---|---|
| GB | 2 136 526 | 9/1984 |

* cited by examiner

*Primary Examiner* — Timothy D Collins
*Assistant Examiner* — Jamie S Stehle
(74) *Attorney, Agent, or Firm* — Andrus, Sceales, Starke & Sawall, LLP

(57) ABSTRACT

A torque limiter device for an aircraft wing-mounted flap includes a drive input, an output rotatable in response to rotation of the drive input, and a roller-jammer operable in the event that the torque transmitted between the drive input and the output exceeds a predetermined level to apply a braking load to the drive input and/or the output, and a brake device operable to apply a braking load to the roller-jammer device to cause activation thereof.

12 Claims, 3 Drawing Sheets

TORQUE LIMITER WITH BRAKE

BACKGROUND

This invention relates to a torque limiter incorporating a brake, and in particular to a device suitable for use in aerospace applications, for example at or adjacent the outboard ends of an aircraft wing.

It is known for a rotatable drive shaft to be provided which extends along the length of an aircraft wing and which is used to drive the actuators used to control the positions of, for example, wing mounted moveable flaps, slats or other flight control surfaces. The shaft is typically rotated, in use, by a motor located at an inboard position. A number of types of motor, for example of hydraulically powered or electrically powered form, are known for such use.

Torque limiting devices are often provided between the drive shaft and the actuators associated therewith, the torque limiting devices being arranged to apply a braking load to the drive shaft in the event that the torque being transmitted between the drive shaft and the actuator with which the torque limiter is associated exceeds a predetermined value typically due to a jam of the actuator or associated control surface. As a result, in the event of the applied torque becoming excessive, the drive shaft and all of the actuators associated therewith become locked against further movement. One form of torque limiting device used in such applications is a roller-jammer type device.

It is also known to provide a separate friction brake device typically towards the outboard end of the drive shaft, for example to allow the selective application of a braking load to the outboard end of the drive shaft in the event of a failure of the drive shaft or motor in order to brake the drive shaft and lock the control surfaces in position, preventing them from being moved by aerodynamic loads. GB2136526 describes a friction brake arrangement for use in such an application, the brake being electromagnetically operated in the event of a drive shaft failure being sensed.

The above arrangement of torque limiter and separate selective brake device results in an undesirable duplication of brake components within the two devices and increased weight and size of the control surface actuation system.

In aerospace applications it is desirable to be able to minimise the weight of components mounted upon the aircraft, as the carrying of unnecessary weight results in the aircraft operating relatively inefficiently.

SUMMARY OF THE INVENTION

According to the present invention there is provided a torque limiter device comprising a drive input, an output rotatable upon rotation of the drive input, and a roller-jammer device operable in the event that the torque transmitted between the drive input and the output exceeds a predetermined level to apply a braking load to the drive input and/or the output, and a brake device selectively operable to apply a braking load to the roller-jammer device to cause activation thereof.

The drive input is preferably arranged to be driven by a drive shaft extending in sections along the length of an aircraft wing, the drive output being connected, in use, to or forming part of a wing mounted actuator for use in driving a flap, slat or other flight control surface for movement. Conveniently, the torque limiter device is located at or adjacent the outboard end of the drive shaft. Alternatively, a torque limiter device according to the invention may be located at several or each actuator driving a flap, slat or other flight control surface.

In such an arrangement, the roller-jammer device is used to apply a braking load to the drive input and/or the output both in the event of the applied torque exceeding a predetermined level and in the event of the operation of the brake device, rather than providing separate devices associated with the torque limiter and with the brake. The saving in weight that such an arrangement can achieve is advantageous.

The roller-jammer device preferably comprises a roller cage arranged to move angularly relative to one of the drive input and the output in the event of the applied torque exceeding the predetermined level, the roller cage locating a plurality of rollers in a cavity between a stationary outer abutment surface of circular cross-section and a rotatable inner abutment surface of non-circular cross-section, such angular movement causing the rollers to bear against the abutment surfaces, resisting relative rotation therebetween. An axially moveable worm gear is preferably arranged to cause such movement of the roller cage.

The brake device is preferably operable to cause angular movement of the cage relative to the said one of the drive input and output. The brake device preferably comprises a series of brake discs, and an actuator operable to control the braking load applied by the brake discs. The actuator is preferably an electromagnetic actuator. Conveniently, spring biasing means apply a compressive load to the brake discs, the actuator countering the biasing load applied by the spring biasing means. A lever is preferably provided through which the actuator applied load is transmitted to the brake device.

BRIEF DESCRIPTION OF THE DRAWINGS

The invention will further be described, by way of example, with reference to the accompanying drawings, in which.

DETAILED DESCRIPTION

Figure 1:
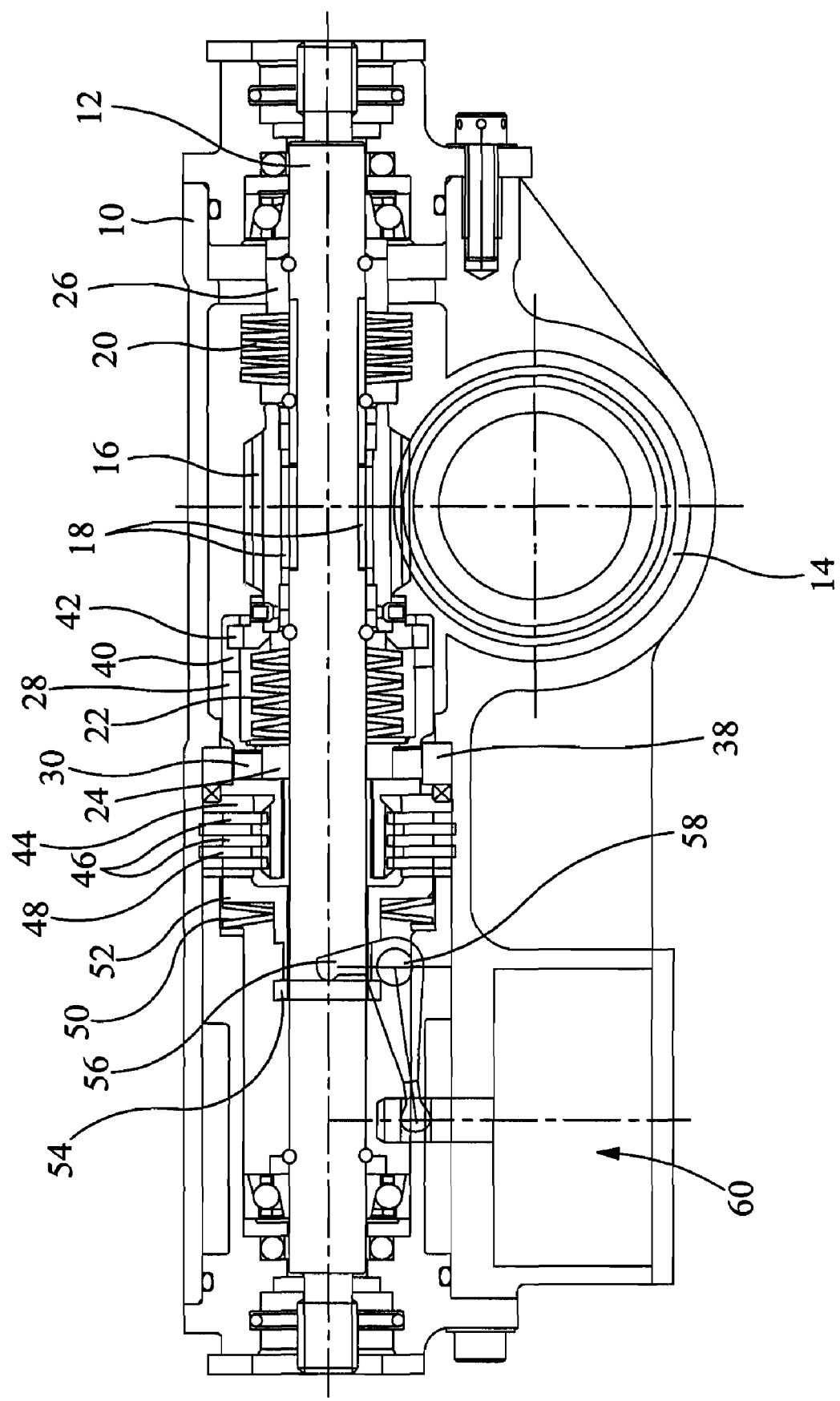
FIG. 1 is a sectional view illustrating a torque limiter device in accordance with one embodiment of the invention.

The torque limiter device illustrated in the accompanying drawings comprises a housing 10 in which a rotatable drive input 12 is supported for rotation, the drive input 12 including drive formations, for example splines, arranged to cooperate with corresponding formations provided on a drive shaft (not shown) which extends along the length of an aircraft wing. The housing 10 further supports a rotatable output screw 14 for rotation. The output screw 14 is connected to or forms part of an actuator operable to move a flap, slat or other flight control surface.

Keyed to the drive input 12 is a worm gear 16 which meshes with thread formations provided on the output screw 14 to transmit rotation of the drive input 12 to the output screw 14. The worm gear 16 is keyed to the drive input by means of bronze slider components 18. Disc spring packs 20, 22 bear against respective ends of the worm gear 16, the spring packs 20, 22 bearing against shoulders 24, 26 mounted upon the drive input 12. The spring packs 20, 22 serve to maintain the worm gear 16 in a predetermined axial position relative to the drive input 12 in normal use, but permit the worm gear 16 to translate along the drive input 12 by a limited amount in the event that the applied torque exceeds a predetermined level.

Figure 3:
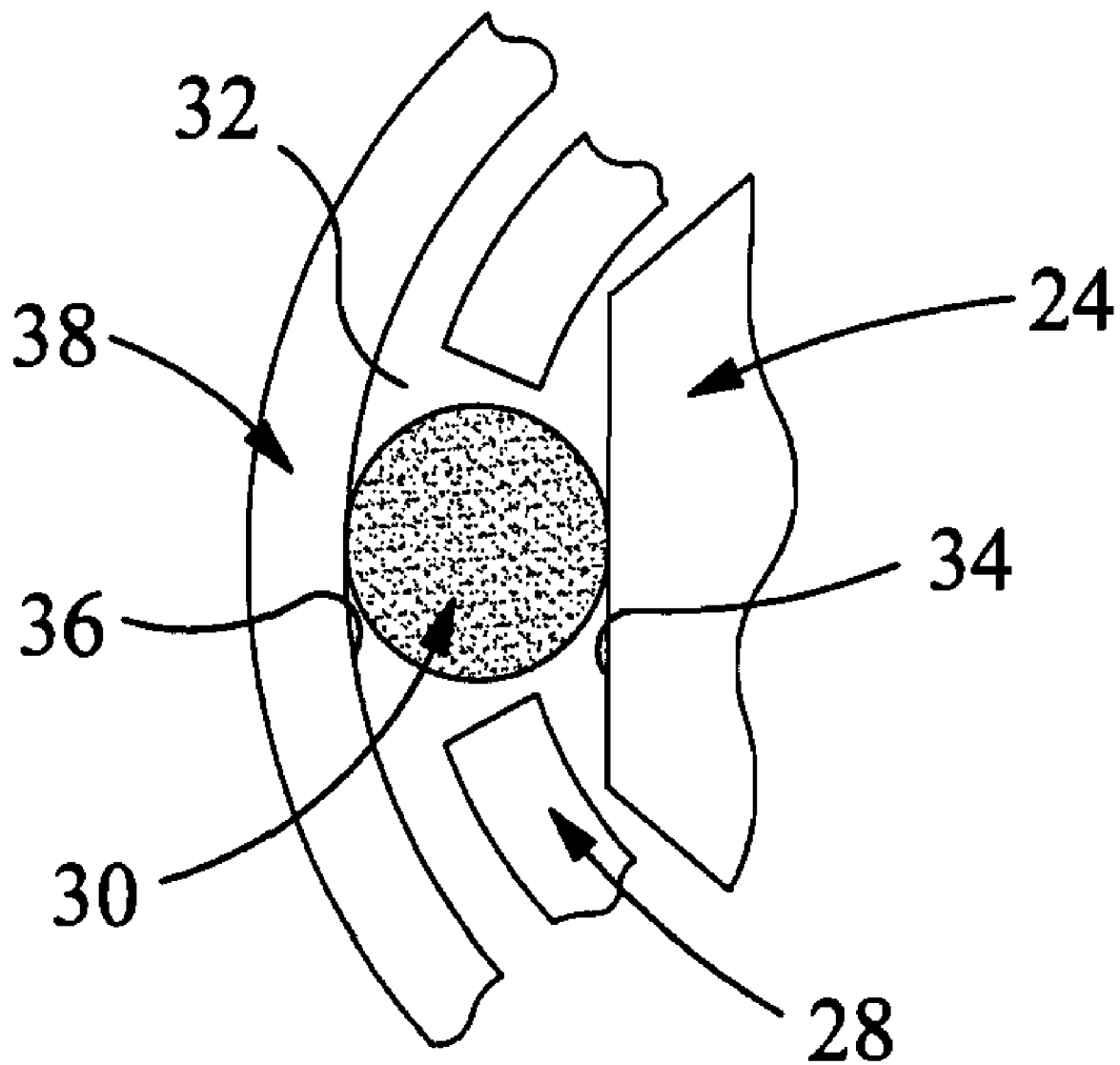
FIG. 3 is a diagrammatic sectional view illustrating part of the device of FIG. 1.

A roller cage 28 encircles part of the drive input 12, the cage 28 locating a series of rollers 30 in a cavity 32 defined between an inner abutment surface 34 formed by the outer periphery of the shoulder 24 and an outer abutment surface 36 formed by the inner periphery of an annular ring 38 mounted to the housing 10, as best shown in FIG. 3. The inner abutment surface 34 is of generally hexagonal cross-sectional shape, whilst the outer abutment surface 36 is of circular cross-section. It will be appreciated that the cavity 32 is thus of non-uniform radial clearance. The cage 28 holds the rollers 30 in the parts of the cavity 32 of maximum radial clearance, in normal use.

Figure 2:
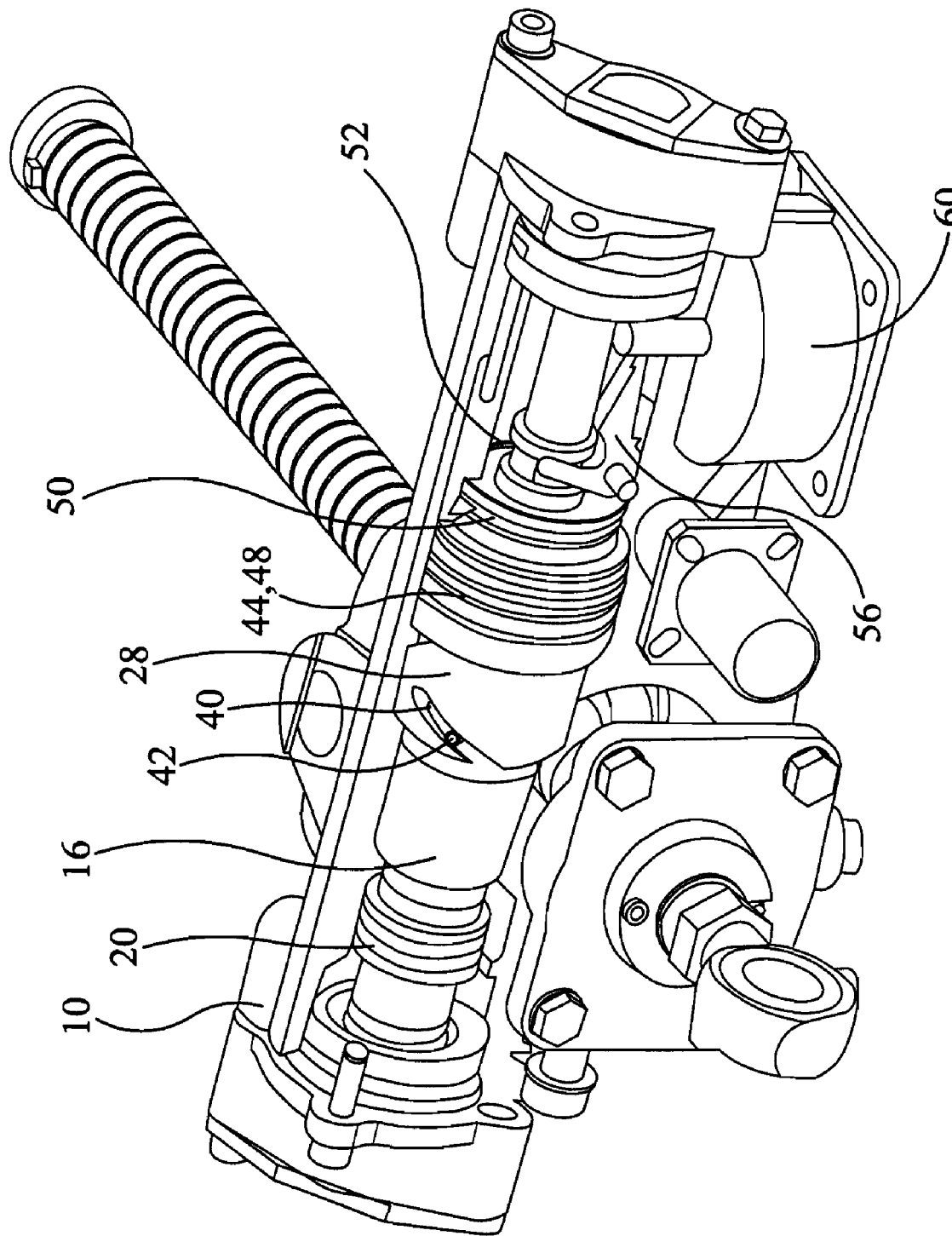
FIG. 2 is a perspective view illustrating the device of FIG. 1.

The cage 28 is supported for limited rotation within the annular ring 38 by the rollers 30. Abutment between the cage 28, the shoulder 24 and a further shoulder 44 restricts axial movement of the cage 28. As best shown in FIG. 2, an angled slot 40 is formed in the cage 28 in which is received a pin 42 mounted upon the worm gear 16.

Keyed to an end part of the cage 28 remote from the angled slot 40 are a series of brake discs 46 which are interleaved with brake discs 48 keyed to the housing 10. Disc springs 50 are provided between an abutment formed in the housing 10 and a collar 52 which bears against the brake discs 46, 48, applying a compressive load thereto.

The collar 52 includes a flange 54 against which an end of one limb of an L-shaped lever 56 bears, the lever 56 being pivotally mounted to the housing 10 by a pivot pin 58. The free end of the other limb of the lever 56 is coupled to the armature of an electromagnetic actuator 60, the actuator 60 being arranged such that energisation thereof applies a load to the collar 52 countering the action of the disc springs 50.

In normal use, the actuator 60 is energised, thus the brake discs 46, 48 are not compressed and the brake loading applied thereby is minimal. Rotation of the drive input 12 is transmitted to the output screw 14 via the worm gear 16. Provided the applied torque does not exceed a predetermined level, the worm gear 16 is held against significant axial movement by the disc spring packs 20, 22, and the cooperation between the pin 42 and the angled slot 40 in the cage 28 ensures that the cage 28 rotates with the drive input 12, holding the rollers 30 in the parts of the cavity 32 of maximum clearance.

In the event that the torque applied the device exceeds the predetermined level, for example as a result of a failure or jam in the associated actuator or control surface, the reaction between the worm gear 16 and the helix angle of the thread formations of the output screw 14 results in axial movement of the worm gear 16 occurring against the action of one or other of the disc spring packs 20, 22, depending upon the direction in which the drive input 12 is being rotated. The axial movement of the worm gear 16 relative to the drive input 12 causes angular movement of the cage 28 relative to the drive input 12, by virtue of the pin 42 being received in the angled slot 40 formed in the cage 28. The angular movement of the cage 28 relative to the drive input 12 results in the rollers 30 no longer being held in the parts of the cavity 32 of maximum clearance, but rather in the rollers 30 reaching positions in which they bear against both the inner and outer abutment surfaces 34, 36, becoming jammed therebetween and so resisting rotation of the drive input 12, and hence rotation of the output screw 14.

It will thus be appreciated that the occurrence of a jam or other failure giving rise to the increased torque results in all of the actuators driven by the drive shaft being frozen or locked against further movement.

If it is sensed that the drive shaft or motor has failed or there is an electrical failure or for any other reason it is considered desirable to lock the torque limiter and hence the actuator/control surface against movement, the actuator 60 is deenergised. Such deenergisation results in the load countering the effect of the disc springs 50 being reduced, and in the disc spring 50 thus being able to compress the brake discs 44, 46, thereby applying a braking load to the cage 28. The continued rotation of the drive input 12 either by the motor or by external forces backdriving the output screw 14 and worm gear 16 results in the cage 28 no longer holding the rollers 30 in the parts of the cavity 32 of maximum clearance and, as described hereinbefore, jamming quickly occurs resisting further movement of the drive input 12. During the short period in which the rotation of the drive input 12 continues, the worm gear 16 may move axially relative to the drive input 12, by virtue of the location of the pin 42 in the angled slot 40, against the action of one or other of the spring packs 20, 22.

It will be appreciated that the arrangement described hereinbefore is advantageous in that the torque limiting and brake functions are both achieved in a simple and convenient, relatively low weight manner within the same housing and using a common roller-jam brake arrangement. Torque limitation and braking are possible in both operating directions. The mechanical advantage achieved by use of the lever 56 allows a relatively small, low weight actuator to be used to counter the action of the springs 50, thereby achieving further weight reductions.

The description hereinbefore is of one specific example or embodiment of the invention, but it will be appreciated that a wide range of modifications and alterations may be made thereto without departing from the scope of the invention.

The invention claimed is:

1. A torque limiter device comprising a drive input, an output rotatable upon rotation of the drive input, and a roller-jammer device operable in the event that the torque transmitted between the drive input and the output exceeds a predetermined level to apply a braking load to at least one of the drive input and the output, and a brake device selectively operable to apply a braking load to the roller-jammer device to cause activation thereof.

2. A device according to claim 1, wherein the drive input is arranged to be driven by a drive shaft extending in sections along the length of an aircraft wing, and the drive output is connected, in use, to or forms part of a wing mounted actuator.

3. A device according to claim 2, wherein the torque limiter device is located at or adjacent an outboard end of the drive shaft.

4. A device according to claim 1, wherein the roller-jammer device comprises a roller cage arranged to move angularly relative to one of the drive input and the output in the event of the applied torque exceeding the predetermined level.

5. A device according to claim 4, wherein the roller cage locates a plurality of rollers in a cavity between a stationary outer abutment surface and a rotatable inner abutment surface.

6. A device according to claim 5, wherein the cavity is of non-uniform dimensions.

7. A device according to claim 6, wherein the outer abutment surface is of circular cross-section and the inner abutment is of non-circular cross-section.

8. A device according to claim 4, wherein an axially movable worm gear is arranged to cause such angular movement of the roller cage in the event that the applied torque exceeds a predetermined level.

9. A device according to claim 4, wherein the brake device is operable to cause angular movement of the cage relative to the said one of the drive input and output.

10. A device according to claim 9, wherein the brake device comprises a series of brake discs, and an actuator operable to control the braking load applied by the brake discs.

11. A device according to claim 10, wherein the actuator is an electromagnetic actuator.

12. A device according to claim 10, wherein a lever is provided through which the actuator applied load is transmitted to the brake device.

* * * * *